United States Patent [19]
Samad et al.

[11] Patent Number: 5,486,996
[45] Date of Patent: Jan. 23, 1996

[54] PARAMETERIZED NEUROCONTROLLERS

[75] Inventors: Tariq Samad; Wendy K. F. Graber, both of Minneapolis; Ahmet F. Konar, Circle Pines, all of Minn.

[73] Assignee: Honeywell Inc., Minneapolis, Minn.

[21] Appl. No.: 8,963

[22] Filed: Jan. 22, 1993

[51] Int. Cl.⁶ .................................................. G05D 13/02
[52] U.S. Cl. ..................... 364/152; 364/158; 364/162; 395/21
[58] Field of Search ................................. 364/148, 152, 364/162, 157, 158, 187; 395/21, 23, 22

[56] References Cited

U.S. PATENT DOCUMENTS

| | | | |
|---|---|---|---|
| 5,111,531 | 5/1992 | Grayson et al. | 395/23 |
| 5,142,612 | 8/1992 | Skeirik | 395/11 |
| 5,159,660 | 10/1992 | Lu et al. | 395/22 |
| 5,268,834 | 12/1993 | Sanner et al. | 364/151 |

FOREIGN PATENT DOCUMENTS 0519502A  12/1992  European Pat. Off. .

OTHER PUBLICATIONS

J. J. Helferty et al., "Experiments in Adaptive Control Using Artificial Neural Networks", Aug., 1990, *IEEE International Conference on Systems Engineering,* in Pittsburgh, Pa., pp. 339–342.

C.-C. Ku et al., "System Identification and Control Using Diagonal Recurrent Neural Networks", Jun., 1992, *1992 American Control Conference,* at Chicago, Ill., vol. 2, pp. 545–549.

H–T. Su et al., "Control and System Identification Using Elements of Neural Network Computation Engineering", Jun., 1992, *1992 American Control Conference,* at Chicago, Ill., vol. 1, pp. 485–489.

*Primary Examiner*—Paul P. Gordon
*Attorney, Agent, or Firm*—Paul H. McDowall; John G. Shudy, Jr.

[57] ABSTRACT

A controller based on a neural network whose output is responsive to input signals that represent user or designer defined control system parameters which may include process parameters, control parameters and/or disturbance parameters. The neural network can be "trained" to mimic an existing controller which may or not receive inputs of control system parameters. The trained neural network controller may have advantages of faster execution and reduced code size. The neural network can also be trained to result in a nonlinear controller that is more powerful than an existing controller.

9 Claims, 3 Drawing Sheets

PARAMETERIZED NEUROCONTROLLERS

This patent relates to controllers that supply signals to controlled processes enclosed with control systems and, more particularly, to those controllers that are responsive to process variation, to changing objectives on the part of the user of the controlled system or process, and to disturbance features of the process (such as noise), as well as to how the process is controlled.

BACKGROUND OF THE INVENTION

Algorithmic controllers need to be extraordinarily complex to provide the features provided by a neural network controller as described in this patent. Accordingly, a tremendous amount of development time is avoidable by using the teachings of this invention.

Artificial neural networks have the potential to provide revolutionary capabilities to control systems, including the ability to accurately model, based on input/output data, highly nonlinear and multidimensional functions and dynamical systems. They can provide compact, efficient implementations with high degrees of generalization and robustness, and are highly suitable for hardware implementation at the present time.

However, except for the applicant's NeuroPID Controller (the subject of U.S. patent application Ser. No. 07/829,996, filed Jan. 31, 1992), now U.S. Pat. No. 5,396,415 issued Mar. 7, 1995 no neural net controller implementation comes close to achieving these potential advantages, and its application is limited as will be discussed later. In the NeuroPID, the controller is application independent, an important feature. Controller behavior can be adjusted for different applications through a specific set of controller parameters, i.e., the Proportional, the Integral, and the Derivative gains. These are the same parameters that are employed by conventional linear PID controllers. The NeuroPID implements an optimized nonlinear controller with a PID interface.

The NeuroPID can be contrasted with the prior art teachings for developing neural network controllers. In prior neural network controllers, neural networks are developed for specific process models and no explicit allowance is made for different processes, for process variation, for disturbances or for changing requirements (due to user demand) for the control system.

Other examples of the use of neural networks in control applications includes system identification, both structural and parameter identification and automatic tuning. In these cases (and unlike the NeuroPID controller and Parameterized Neurocontrollers), the neural network is not itself a controller, but provides information that is useful to improve the performance of a separate, non-neural controller.

Although the NeuroPID controller is a significant advance over the prior art, the restriction to the three PID parameters renders it of limited utility to many applications—in particular, to multivariable processes, highly nonlinear processes, and processes with significant time delays.

It has been discovered that the concepts described in the NeuroPID Controller can be generalized to comprehend significantly broader applications. This generalization is achieved by allowing a greater variety of parameters as input to the controller. The generalized parameters allow the behavior of the neural net controller to be modified by a user, a software, or a hardware system that are linked to the controller in some appropriate way. Any parameters or sets thereof may be used with this invention. No previous neural network controllers could do that.

There are three different kinds of parameters which may be allowed as input to the neural net controller. These are: Control Parameters, $p_c$, Process Parameters, $p_p$, and Disturbance Parameters, $p_d$. Control parameters are generally the kind of parameters that allow modification of controller behavior for any given process. Examples of control parameters are: relative weightings for servo-response accuracy vs. control energy; time to reach set point; time to return to set point after a disturbance; rise time; settling time; the horizon (over which the future is judged in making determinations about whether a series of control moves is satisfactory or not); the maximum allowable rate of actuator movement; proportional, integral and derivative (PID) gain parameters; and reference model parameters, future reference responses, etc.

Process parameters relate to distinguishing aspects of the particular processes the controller is developed for. These include: dead time or delay; the process time constant; the process gain; process damping coefficient; process dynamic order; relative amounts of various nonlinear characteristics (e.g., exponential, quadratic, logarithmic, hysteretic); and other parameters which may be used to encode a broad range of nonlinearities in the process; among others.

Disturbance parameters relate to factors external to the process but which affect its behavior. These are commonly thought of in many control situations as noise. Examples include (in a building temperature control application): people entering or leaving; changes in environmental conditions, including overcast weather vs. sunny days; ambient external temperature; and so forth. In order for these types of parameters, $p_d$, to be used as inputs to a neural network controller (and perhaps to any controller), the disturbance parameters must be either measurable, modelable or predictable.

In any specific parameterized neurocontroller, any one or two, or even all three of these parameter types may be used. Each one of these parameter types may consist of any number of individual parameters depending on the desired result.

SUMMARY OF THE INVENTION

This invention teaches a controller based on a neural network whose output is responsive to input signals that represent user defined, or designer defined, parameters which may include parameters from all or some of the parameter types; process parameters ($p_p$), control parameters ($p_c$), and disturbance parameters ($p_d$). When referred to together these are called control system parameters P. There may be any number (from zero to whatever number runs out the controller capacity or designer patience) of parameters selected from any one, two, or all three of the P groups of parameters.

In the preferred embodiment, the neural network is a dynamic or algebraic (e.g., feed forward) network. Examples include *multilayer perceptron networks* described by David E. Rumelhart, Geoffrey E. Hinton and Ronald J. Williams (Learning internal representations by error propagation. In "Parallel Distributed Processing: Explorations in the Microstructure of Cognition, Vol. 1", D. E. Rumelhart and J. L. McClelland (Eds.), Cambridge, Mass.: MIT Press, 1986), and *radial-basis function networks* by John Moody and Christian J. Darken (Fast learning in networks of locally-tuned processing units. "Neural Computation", 1, pp. 281–294, 1989), which are well known algebraic forms.

Barak A. Perlmutter (Learning state space trajectories in recurrent neural networks. "Neural Computation", 1, pp. 263–269, 1989) describes a *dynamic, continuous time type* network which could be used. Jeffrey L. Elman ("Finding Structure in Time", Technical Report 8801, Center for Research in Language, University of California, San Diego, La Jolla, Calif. 92093, 1988), describes a *dynamic, discrete time type* network which could also be used. In fact, nearly any type of neural network can be used.

However, we have some concerns about the typical Hopfield variety which is constrained in that it accepts one and only one input to each node from outside the network and each node communicates with every other node, and where any two nodes (i,j) share weight values (such that $w_{ij} = w_{ji}$). Such networks are likely to be unsatisfactory.

In general, the network produces output that is some function of the P parameters used, the weights in the network, and error feedback inputs. Error feedback inputs may include the process output, the setpoint or reference model output, the error between the setpoint and the actual output, integrals and/or derivatives of this error, process state variable estimates, and so forth.

Such a neural network can be trained to mimic an extant controller, in one preferred embodiment, by the addition of a processor for running the learning algorithm which receives output from the parameterized neurocontroller (hereinafter "PNC") and the extant controller. Either before or in the learning algorithm processor, a comparison of the two is done until an appropriate level of proficiency is demonstrated by the neural network controller. The extant controller output is taken on-line in the closed loop. The training can be done on-line, or later with collected data.

Training can also be done off-line over a variety of process models. A development system for creating PNC's is also described.

Training of the neural network is generally based on determining values of network weights that optimize some criterion of interest. A number of specific stochastic and deterministic algorithms can be used, including genetic algorithms, "chemotaxis", back propagation, counter propagation, conjugate gradient, and other first and second order methods known to those of skill in the art. Network "training" may also actually involve configuring or determining the structure of the nodes and their relations using genetic algorithms or other methods known to those of skill in the art. The criteria are selected by the user or customer for the controller.

DETAILED DESCRIPTION OF THE DRAWINGS

Figure 1:
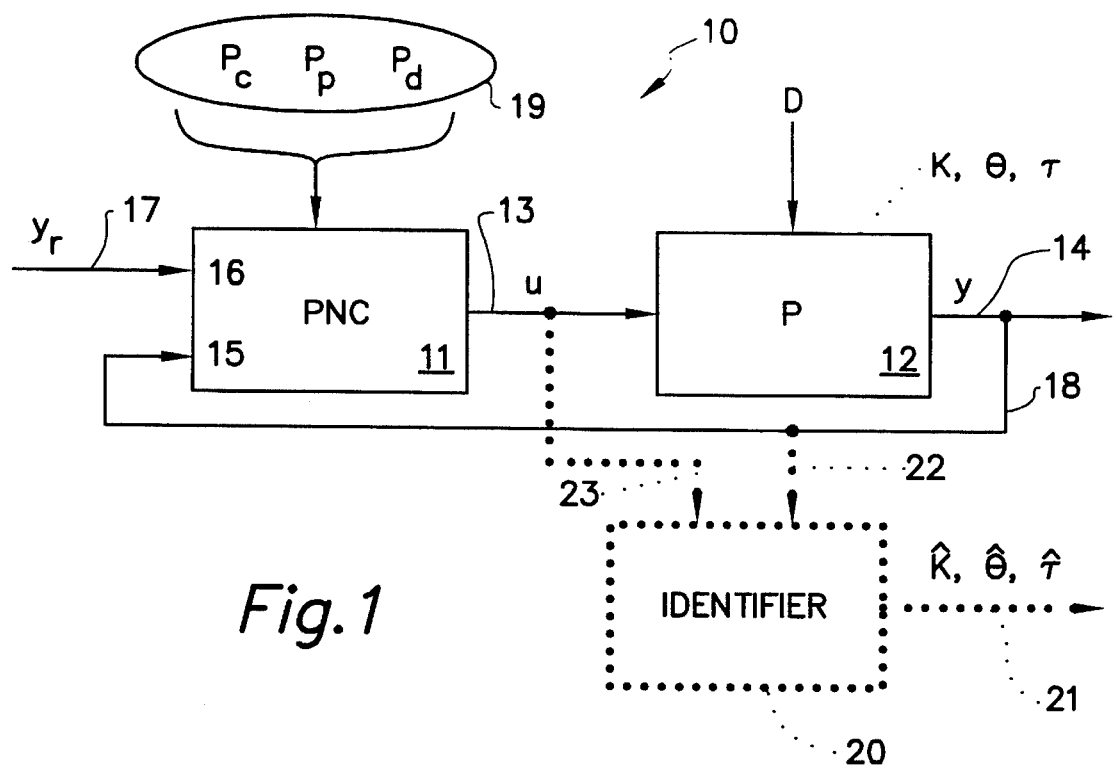
FIG. 1 is a block diagram of a parameterized neurocontroller (PNC) in a closed loop system where it provides signals representing control moves to the process.

FIG. 1 describes a generalized control system 10 having a process (P) 12 (which could include an environment, a processing plant of various kinds, existing control systems or some other kind of system), which receives control adjustment signals as input (u) 13 which are the output of the controller 11 (here, the controller is a parameterized neurocontroller (PNC)). A measure of the output of the process y is produced as a signal on line 14 which is fed back to the PNC on line 18 to input 15. The PNC continues its control moves based on whatever is appropriate vis-a-vis the reference input $y_r$ on line 17 to input 16. In the example of the parameterized neurocontroller, the user or some automatic system could feed inputs representing the desired $p_c$, $p_p$, and/or $p_d$ parameter values (19). There may be any number (from zero to whatever number runs out the controller capacity or designer patience) of parameters selected from any one, two, or all three of the P groups of parameters. As in any real-world process, the process 12 can be disturbed by disturbances, D.

The process itself may be characterized by certain parameters, here, for example, in dotted line K, τ, and Θ (these are of the $p_p$ variety).

If desired, these process parameters may be identified by a process identifier 20 which receives the inputs to the process (u on line 23) and the outputs from the process (y on line 22). The identifier can produce a representation of the parameters which are used in the process identification K, τ, and Θ. If desired, the identifier 20 could be constructed as part of the controller 11. The identified process parameters could be input to the PNC, thus supplying some or all of the $p_p$.

In general, processes can be defined by the following algebro-differential system:

$$\frac{dx_p(t)}{dt} = f(x_p(t), x_p(t-T_1), \ldots, x_p(t-T_n), u(t),$$
$$u(t-\tau_1), \ldots, u(t-\tau m), p, t), x(0) = x_0$$

$$0 = g(x_p(t), x_p(t-T_1), \ldots, x_p(t-T_n), u(t),$$
$$u(t-\tau_1), \ldots, u(t-\tau m), p, t)$$

$$y(t) = h(x_p(t), x_p(t-T_1), \ldots, x_p(t-T_n), u(t),$$
$$u(t-\tau_1), \ldots, u(t-\tau m), p, t).$$

For many processes, a simplified form of this system suffices in which the set of algebraic equations, 0=g(.), is not needed.

In these equations, $x_p$ represents the dynamic state variables of the process, u represents process inputs, y represents process outputs, and p represents parameters that characterize the system. The $T_i$ and $\tau_i$ are state and input time delays, and, along with p, constitute the process parameters $p_p$. In the general case, u, $x_p$, p and y are all vectors of appropriate sizes. The process parameters determine the dynamic behavior of the process. In a room temperature control application, for example, the volume (size) of the room, the heat conductances of the walls and floors, etc., would be process parameters. The process parameters can vary over time. Thus, if a door to an adjoining room was opened, the effective volume for heating or cooling purposes would be increased.

Any kind of process parameter is acceptable for use with a Parameterized Neurocontroller. It should be noted that while process state variables or estimates thereof can be inputs to the neural network (e.g., the neural network could be a state feedback controller), at least one process, control or disturbance parameter must also be an input.

State variables have been input to neurocontrollers as shown in; T. Troudet, S. Garg and W. Merrill, Design and Evaluation of a Robust Dynamic Neurocontroller for a Multivariable Aircraft Control Problem. Proc. International Joint Conference on Neural Networks, Vol. 1, Baltimore, pp. 308–314, 1992. However, they do not teach input of the process, control or disturbance parameter(s).

Another configuration would be to have a plurality of neural network PNC's with a rule-based processor up front, selecting the one best trained based on the value of the P input.

The description of the parameters (P) which may be fed to the PNC has already been made in the background section of this application.

There has also been discussion concerning the various forms the individual neural network for the PNC's could take, in the summary above. To further generalize, a set of equations could be used to define the controller output u from the neural network. Neural networks may be defined by their function. The algebraic types can be defined generally by the following functions:

$$u(t) = g\ (P,\ w,\ e(t), t),\ \text{or}$$
$$u(t) = g\ (P,\ w,\ y(t),\ y_r(t), t),\ \text{or}$$
$$u(t) = g\ (P,\ w,\ e(t),\ e(t - T_{e,1}),\ \ldots,\ e(t - T_{e,k}),\ \text{or}$$
$$u(t) = g(p,\ w,\ x_p(t - T_{xp,1}),\ \ldots,\ x_p(t - T_{xp,k}),\ y_r(t - T_{yr,1}),\ \ldots,\ y_r(t - T_{yr,m}), t),\ \text{or}$$
$$u(t) = g\ (P,\ w,\ y(t),\ y(t - T_{y,1}),\ \ldots,\ y(t - T_{y,k}),\ y(t - T_{yr,1}),\ \ldots,\ y(t - T_{yr,m}),\ \text{or}$$

$$u(t) = g\left(P,\ w,\ e(t),\ \int_{t_o}^{t} e(t)dt,\ \dot{e}(t)\right)$$

where w represents the weights of the network and $x_p$ represents the process state variables (or estimates thereof), $$e \equiv y_r - y, \int_{t_o}^{t} e(t)dt\ \text{is the integral of the error from}\ t_o\ \text{to}\ t,$$

$\dot{e}(t)$ is the rate of change of error at time t, and $T_{e,i}$, $T_{y,i}$, $T_{yr,i}$ and $T_{xp,i}$ are time delays (not necessarily non-zero) in values or e, y, $y_r$ and $x_p$, respectively.

The dynamic, continuous time type neural networks intended for use with these inventions have their output defined by the following dynamical system:

$\dot{x}(t) = f\ (x(t),\ p_c,\ p_p,\ p_d,\ w,\ e(t))$ $u(t) = g\ (x(t),\ p_c,\ p_p,\ p_d,\ w,\ e(t))$ $x(o) = x_o$, where x is the state vector for the neural network.

The dynamic, discrete time type neural networks may be defined by the following dynamical system:

$x(t) = f\ (x(t-\delta t),\ p_c,\ p_p,\ p_d,\ w,\ e(t))$ $u(t) = g\ (x(t-\delta t),\ p_c,\ p_p,\ p_d,\ w,\ e(t))$ $x(o) = x_o$ None of the above defining equations is intended to be limiting and it will be noted by one of ordinary skill that weights and errors and y, $x_p$ and $y_r$ parameters and time, and time-delayed values, may be added to or removed while still being capable of defining useable neural networks. These may also be used with this invention.

It should also be recognized that this invention is not limited to Single-Input Single-Output controller applications. Multiple sets of y, $y_r$ and $x_p$ inputs and multiple u outputs may readily be accepted and trained into either Multiple-Input Single-Output or Multiple-Input Multiple-Output versions of one of the varieties of neural networks used for this invention. No restriction is implied that y, $y_r$, $x_p$ and u are scalar quantities. They may be vectors of arbitrary dimension.

Figure 2:
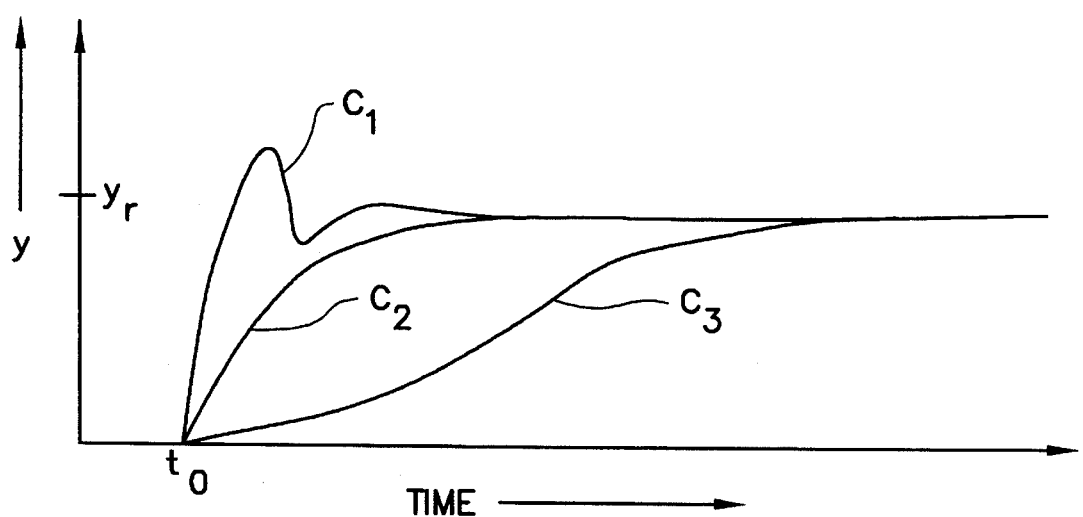
FIG. 2 is a graph of time vs. the process output y, indicating various control curves achievable using different control strategies.

Referring now to FIG. 2 (an example for illustration only—other types of references and curves are easily imaginable by those of ordinary skill in the art), three distinct curves are shown, $C_1$, $C_2$ and $C_3$ for achieving the desired process output at a level represented by $y_r$. For illustrative purposes only, the curve $C_1$ indicates the kind of response a process is likely to give if pushed very hard and very fast to achieve the desired setpoint or reference value as quickly as possible. The likelihood is that there will be substantial overshoot and perhaps also oscillation until setpoint is achieved. Curve $C_2$ has very little overshoot but achieves setpoint somewhat later, and curve $C_3$ achieves setpoint later still. Note that the rise time does not begin until some time after $t_o$, indicating that there is some delay between the time a control signal can be sent and the time that the process responds for this example. A change in an element of $p_c$, e.g., the proportional controller gain, could accomplish similar changes in the response characteristics as shown in FIG. 2. For example, if the proportional gain is turned up, the curve would look more like $C_1$, and if the proportional gain is turned down, the curve would look more like $C_3$. The characteristics of the response curves would also be varied if there were changes in the process disturbances, or measurement noise. For example, if the controller is controlling the amount of chemicals that is being added to a reaction chamber and the speed of the reaction changes tremendously when a certain concentration of one of the chemicals is reached vis-a-vis the rest of the chemicals in the chamber, a process parameter could be incorporated into the inputs received by the PNC in order to account for this expected result. Thus, for example, if the output of the sensor indicated the degree of acidity (or some other measurable quantity) had passed or was approaching a certain point at which the reaction speed would increase dramatically, the failure of the controller to close down the valve releasing the more acid chemical could cause a response curve more similar to $C_1$ or, in fact, allow for a runaway reaction.

As another example, a noise or disturbance parameter change might be appropriately fed into the controller where, for example, it is controlling the heating of a building space. In such a case where the day is unusually bright and sunny and the outside temperature is very warm, the heat load on the building and its ability to dissipate heat into the atmosphere would be reduced. Accordingly, if the operator of a controller desires a response curve similar to $C_2$, different control moves than would ordinarily be required to achieve such a curve need to be output (u) by the PNC to accommodate the disturbances.

Figure 3:
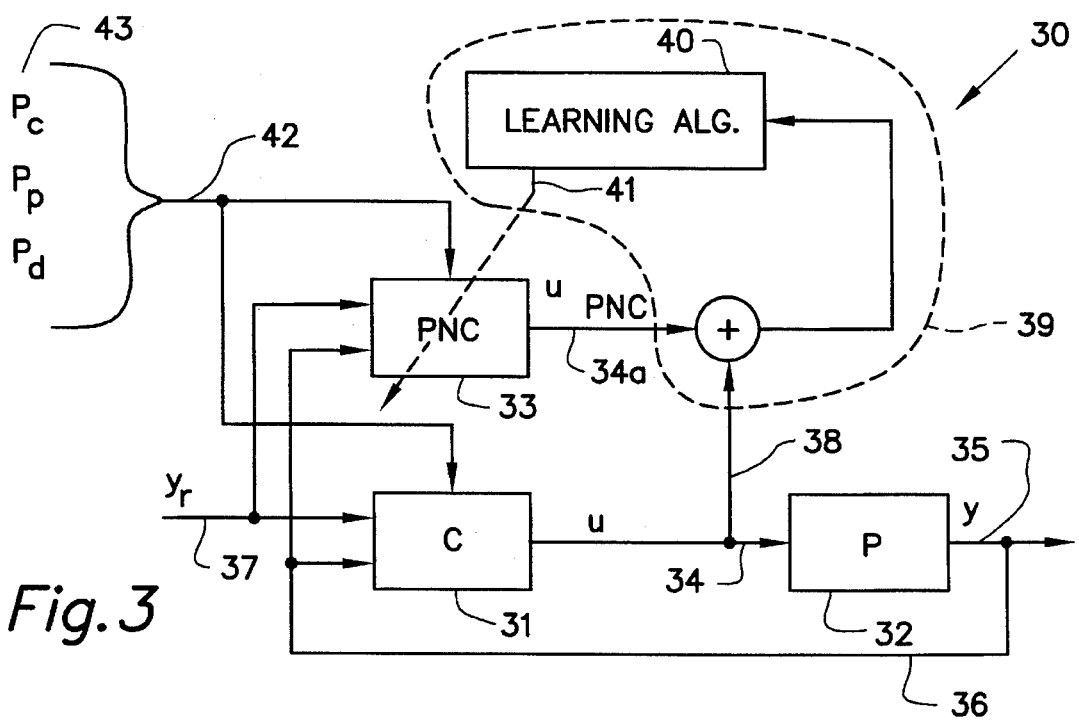
FIG. 3 is a block diagram illustrating a preferred embodiment configuration for training a PNC based on an extant controller.

Referring now to FIG. 3 in which a controlled system 30 is shown having an extant controller 31 (C), a controlled process (P) 32, wherein the control signal output (u) is forwarded to the process (P) on line 34 and the output y from the process is output on line 35. The output y is also fed on line 36 back into the extant controller 31 and the PNC 33. Both produce their control signals in response to the output y and the desired output $y_r$ received from the input line 37. In this instance, the extant controller 31 produces satisfactory output u for controlling the process 32. The PNC in this case is used either to eventually replace the extant controller 31 or to act as a redundancy system, a back-up, or a system trained in environment of a process 32 which is replicated in many instances. In the last case, the PNC, once trained, can be removed from this one particular instance of process 32 and used in other similar processes.

Parameters $p_c$, $p_p$, $p_d$ 43 are normally input in this situation on line 42 into both the PNC and the extant controller 31. However, in many instances, the controller C 31 may have a different set of parameters input to it.

A processor 39 takes the difference of the outputs from line 34a($u_{PNC}$) and 38(u). This difference figure is fed to the learning algorithm 40 contained within the processor 39. The learning algorithm may be of various different types discussed ad nauseam in the literature. These include, for example, the well known methods of back-propagation, conjugate gradient algorithms and genetic algorithms, as well as numerous other possible training methods.

The result of the learning algorithm processing is a signal (line 41) to the PNC 33 to adjust the internal weights or, in fact, its configuration, if that is desired.

It should be noted that if an existing controller is available that provides satisfactory, robust performance, a neural network can be trained to mimic it, as shown here. That is, given the same input, if it is desired that the neural network and the existing controller provide the same output, this is possible. It is also possible to adjust the output so that it still mimics the existing controller based on input parameters 43 that may or may not be input to the extant controller 31. If the existing controller currently requires some parameters that are difficult to supply (e.g., their computation may be involved), the PNC can be provided some more readily available parameters instead. The PNC will then attempt to duplicate the extant controller behavior as accurately as possible given the new parameters. The neural network controller cannot be trained to outperform the existing controller in the set up. However, there are other advantages that still remain for this situation. It is likely that execution will be faster, code size and implementation will be reduced, the training can be done on-line without removing the extant controller 31 from the closed-loop, and different input parameters may be used.

We next describe an alternative approach to PNC development that does not require an existing controller to be available. This approach can result in nonlinear controllers which are substantially more powerful than existing controllers. This approach can also be used for processes that are difficult to control with conventional technology.

For example, the network can be trained so that the controller reduces, minimizes or optimizes criteria such as control energy, servo-response (including response time, maximum percent overshoot, bandwidth), disturbance rejection (including time to return to setpoint and maximum deviation from setpoint) and stability, to name a few. The trained neural network PNC using control parameters $p_c$ can allow on-line trade-offs between competing objectives. An example of a criterion would be a weighted sum of control energy and response error over some time interval, T. In this case, $p_c$ consists of two matricies, R and Q, $$J(u,y,y_r,p_c) = \int_O^T [u^T Ru + (y-y_r)^T Q(y-y_r)]dt.$$

The parameterized neurocontroller would be trained over a range of R and Q parameters (as well as over some simulated process world). Once trained, a user could adjust the controller parameters ($p_c$) in accordance with whatever his current control objectives are.

Optimal PNC development requires the specification of the following information (although suboptimal development may ignore some of this):

One or more process models representative of the application or applications for which the PNC is intended. (For example, these models could be algebraic and/or dynamic; linear and/or nonlinear, lumped or distributed, as chosen by the user.)

A disturbance model (optional).

The control criterion, which may itself be parameterized (e.g., relative weightings on control action vs. servo response).

The inputs to the PNC. These include feedback inputs such as the error, the integrated error, the derivatives of the error, the setpoint, the process output, etc., as well as the controller parameters, including control, process and disturbance parameters. At least one control system parameter P must be included. Disturbance parameters can only be included if a disturbance model is specified.

Ranges should be specified for all process model parameters, including those that are not used as PNC input.

If the disturbance model is parameterized, ranges should be specified for all disturbance parameters, including those that are not used as PNC input.

Ranges for all control parameters must be specified.

The class of input signals to be used for PNC development must be specified. In most cases, it is expected that this will be step inputs (e.g., setpoint changes) of magnitudes within a specified interval.

It should be noted that ranges for all parameters need not be independent. In fact, in many cases it is expected that there will be significant dependencies. Thus, appropriate or reasonable values for control parameters could depend on process parameter values. Ranges can also be points—the corresponding parameter would be held constant. (To accomplish this in training, a module such as module 71 of FIG. 4 may be used.)

Figure 4:
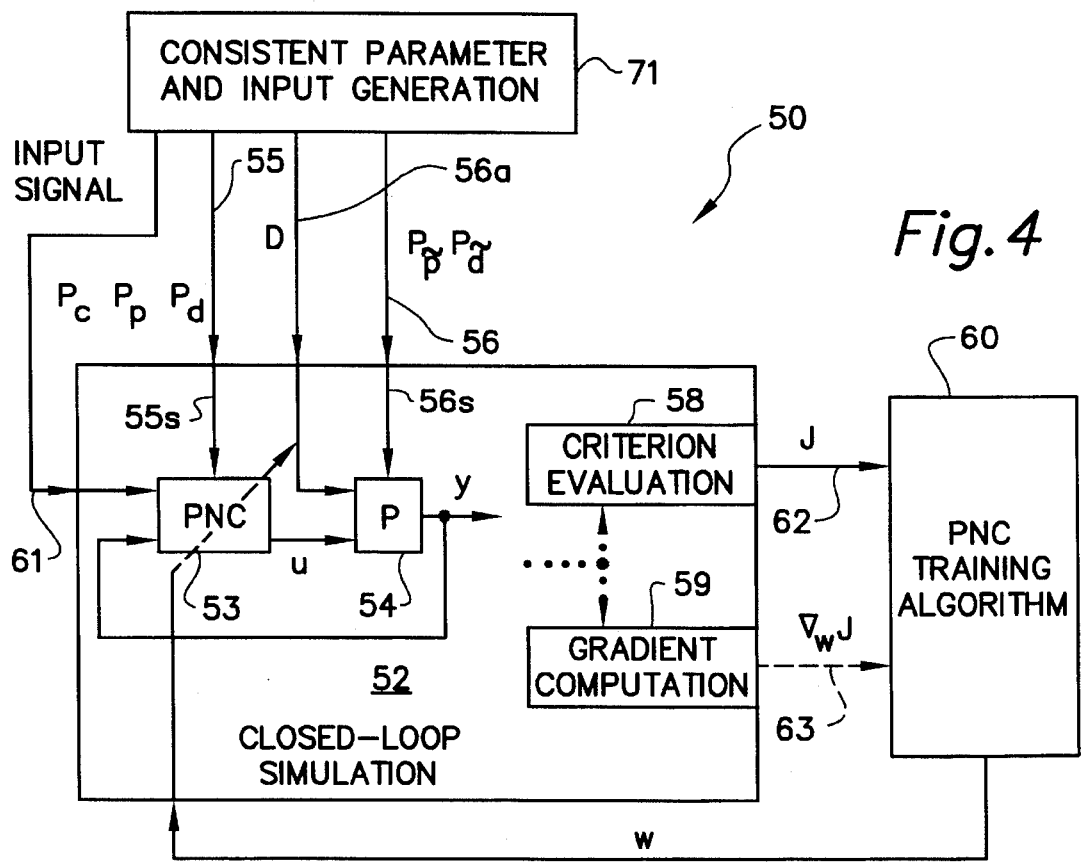
FIG. 4 is a heuristic block diagram illustrating closed loop simulation training of a PNC.

PNC development can be initiated once this information is specified. The development process is schematically depicted in FIG. 4. A parameterized neurocontroller 53 is placed in a simulated control loop with a generalized process model 54 in a closed-loop simulation system 52 which interacts with the PNC training algorithm 60. Input signals for the closed-loop, and parameter values for the process model 56 and for the PNC (55) are generated by a Consistent Parameter and Input Generation module (see infra). The closed-loop simulation system has the capability to evaluate the control criterion on the basis of the results of closed-loop simulations. It also has the ability to calculate gradients of the control criterion relative to the weights of the neural network when this information is needed. The criterion value is passed to the PNC Training Algorithm on line 62 and the gradients are passed to the PNC Training Algorithm (when needed) on line 63.

The function of the PNC Training Algorithm is essentially to configure the PNC to minimize the control criterion. This is done by determining the values of PNC weights but could also involve configuring the network itself, depending on the kind of training used. The PNC Training Algorithm 60 solves this problem in an iterative fashion, successively refining the network and/or its weight values until a minimum is reached. Many specific algorithms can be used for this purpose. Some of these require gradient computation while others do not. In a preferred embodiment a genetic algorithm is used. Genetic algorithms are powerful optimization algorithms. They allow an arbitrarily complex criterion and do not require gradient computation.

Referring again to FIG. 4, a parameterized neurocontroller 53 is placed into a simulated control loop with the process 54 in a closed loop simulation system 52 which interacts with the PNC training algorithm 60 and receives simulated parameter input 55s, while the process receives simulated parameter input on line 56s. The complete set of process model parameters is referred to as $p_\tilde{p}$, the full set of disturbance model parameters are referred to as $P_{\bar{d}}$. These Parameters $p_{\bar{p}}$ and $p_{\bar{d}}$ are input into the process in simulation. A disturbance D is input to the process from box 71 through line 56$a$. These are a superset of parameters available in $p_p$ and $p_d$ to the PNC in simulation. These originate from the Consistent Parameter and Input Generator processor 71.

The output y and all the other signals relevant to evaluation by criterion set by the user are entered into the criteria evaluation unit 58 and the gradient computation unit 59. These units produce signal output representing J and $\nabla_w J$, respectively, where J is the control criterion and $\nabla_w J$, represents the gradients (partial derivatives) of J with respect to each weight in w.

Examples of how the PNC training algorithm 60 may work follow. In both cases, an initial set of weights $w_o$ is generated and then iteratively adjusted. Both of these examples assume network configuration is fixed. These examples are only that and not to be taken as limiting, since for various criterion and situations different methods may be preferred. (The best algorithm to use for a given situation may not be one of the two which follow.)

---
A simple Gradient-Based Training Algorithm:

$w_o$ randomly generated
Repeat
    $w = w + \eta \nabla_w J(w)$
until $\nabla w J(w) < E$

---

(Where $\eta$ is a constant (learning rate parameter) and E is a small number (e.g., 0.001). When $\nabla w J(w) < E$, J is effectively minimized.)

---
A simple Non-Gradient-Based Training Algorithm:
  $w_o$ randomly generated
1    while $J(w) < E2$
2        generate w' in neighborhood of w
3        if $J(w') < J(w)$ then
            w = w'
4        else
            goto 1
5    end while

---

(where E2 is a small number).

This training simulator system 50 may be built as some combination of hardware and software, or all software, if desired. Lines 55 and 56 can provide either simulated or user adjusted parameter inputs. The setpoint or desired response input signal 61 ($y_r$) may also be user defined or be provided in simulation.

The Consistent Parameter and Input Generator for processor or module 71 can include user specified classes of input signals, user specified ranges for parameters, and any dependencies among these ranges. This processor 71 may be a separate piece of hardware, or software, or integrated within the simulation processor. This information may be stored in box 71 preferably. This information is used to provide appropriate parameters and input signals to the closed loop simulation.

Figure 5A:
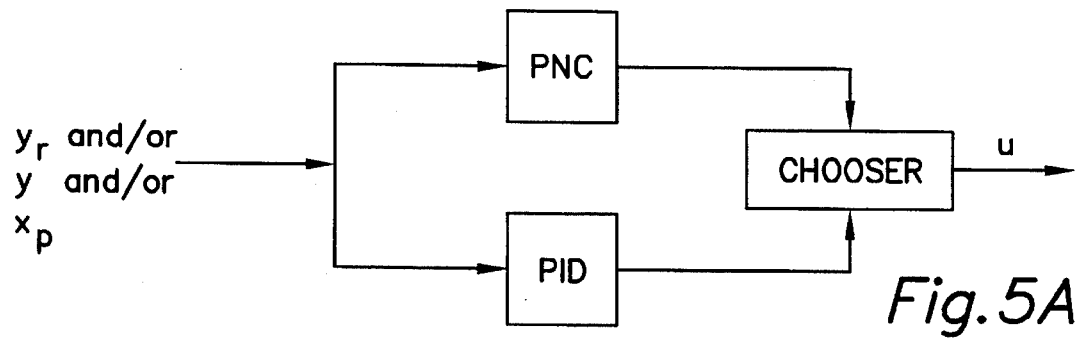
FIG. 5a is a block diagram of a potential control system in which this invention can be employed.
Figure 5B:
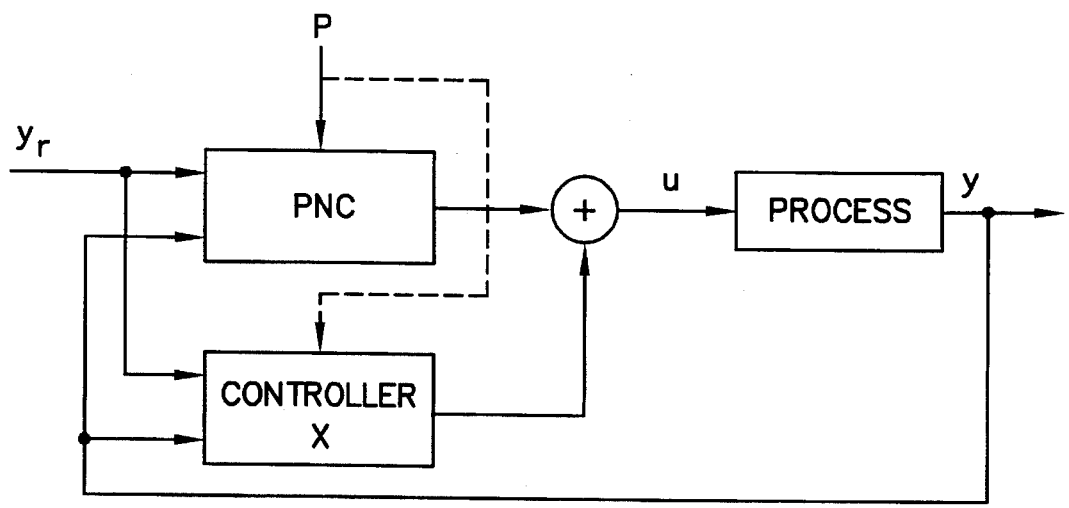
FIGS. 5c and 5b are also block diagrams of other configurations of a control system to which this invention can be applied.
Figure 5C:
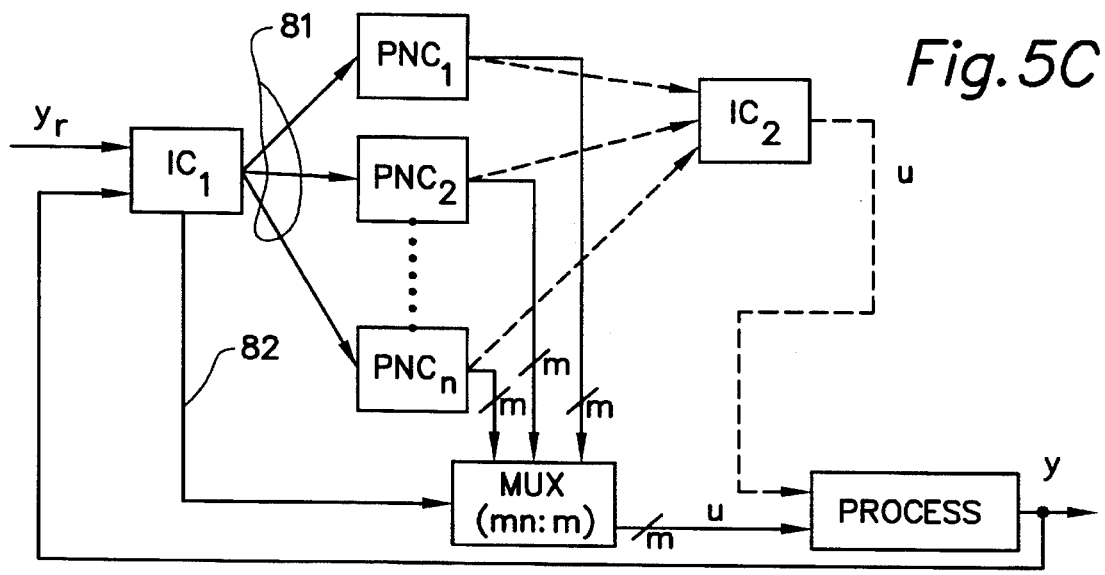

Numerous ways to connect the parameterized neurocontroller into the controlled system may be contemplated that are within the scope of this invention. See for example FIGS. 5$a$, 5$b$ and 5$c$. In FIG. 5$a$ an algorithm in the chooser may select the preferred output between the PNC output and that of, in this example, a PID controller. In FIG. 5$b$ the PNC output is molded with the output of another controller, "Controller X" to produce u. Depending on the application and on the type of controller used, the closed-loop simulator training or extant-controller-based training may also comprehend the controller identified as "Controller X".

See also FIG. 5$c$, where an input controller, $IC_1$, decides which of a series of differently trained (or having different P inputs) PNC's is appropriate for the error or the current operating point of the process. It ($IC_1$) informs the process of its decision either by turning on one of the PNC's ($PNC_1$ . . . $PNC_n$) with an input on one of the lines 81 or by only allowing the signal output of the appropriate PNC to reach the process using a multiplexer type arrangement at the output. The latter arrangement would allow for simultaneous processing, giving $IC_1$ more time to decide which PNC output to use. An alternate form $IC_2$ (in dotted (an output controller)) is also shown in this figure. In this alternative, the suggested control moves are reviewed by $IC_2$ and only the appropriate one is chosen. (It should be noted that one or more of the PNC's could be substituted with a more conventional controller in this figure.) All the forms suggested by these figures do not describe all the applications to which this PNC controller may be put, but are set out as examples to teach that what is claimed may be applied very broadly.

In general, it should be recognized that the use of references to $x_p$, y, $y_r$ and u refers to these as vectors of arbitrary dimension (which also includes the scalar case of dimension=1). As multidimensional vectors, they may comprehend a single series or multiple series of values, thus including both SISO and MISO/MIMO configurations.

We claim:

1. A controller of a process which accepts modification of its behavior through input signals representative of parameters that are members of a set of parameters including: control parameters $p_c$, process parameters $p_p$, and disturbance parameters $p_d$ (which may collectively be called P) wherein said controller comprises a neural network;
wherein the neural network is trained to mimic an existing controller which receives inputs from the set of all P inputs or any subset thereof (except only the subset including only P, I and D inputs), and $x_p$, y, $y_r$, u and all algebraic, differential and integral operators of these $x_p$, y, $y_r$ and u inputs, and has an output in a closed loop use, said training occurring by:

collecting said P parameters, said $x_p$, $y_r$, y, u and any other of said inputs as data, and using said collected data as training data in a learning program which modifies the neural network in a training phase at least until an output from said neural network is similar or identical to the acceptable output generated by said existing controller; wherein:

$x_p$ is dynamic state variables of the process, y is a process output signal, $y_r$ is a reference input signal, and u is a control adjustment signal and, coupling said modified neural network to a second process similar to a first process previously controlled by the existing controller; and applying said neural network to the second process using inputs that the existing controller would have used to control the first process so that the neural network controls the second process.

2. A controller as set forth in claim 1 wherein said controller comprises an input controller processor and a plurality of other controllers, at least one of which other controllers is a neural network.

3. A controller as set forth in claim 2, wherein said input controller processor passes data to inputs of the plurality of other controllers and wherein at least one of said plurality of other controllers further comprises an output controller processor that reviews outputs of said input controller processor and said plurality of other controllers and determines which of those outputs is used as input to the process.

4. A controller as set forth in claim 1 wherein the neural network is trained to extremize criteria using any training method from the set of training methods: Stochastic, non-gradient based, nonlinear; genetic; steepest descent; and second order methods.

5. A controller as set forth in claim 1 wherein training is done off-line over a variety of process models.

6. A controller as set forth in claim 1, wherein the neural network is trained to mimic an existing controller which receives inputs from the set of all P inputs or any subset thereof (except only the subset including P,I and D inputs), and $x_p$, y, $y_r$, u and all algebraic, differential and integral operators of these $x_p$, y, $y_r$ and u inputs, with an output in a closed loop use, said training occurring by:

placing said neural network into the closed control loop so as to receive said P parameters, said $x_p$, $y_r$, y, u and any other of said inputs and also input from a learning program which modifies the network in a training phase at least until the u output from said neural network is similar or identical to the output generated by said existing controller, allowing said existing controller to run in said closed-loop use until said training phase is accomplished; and, placing the trained neural network in the closed loop so as to run the process in said closed-loop use.

7. A controller as set forth in claim 6 wherein said neural network, after said training phase, is employed to run said closed-loop use.

8. A controller of a process which accepts modification of its behavior through input signals representative of parameters that are members of a set of parameters including: control parameters $p_c$, process parameters $p_p$, and disturbance parameters $p_d$ (which may collectively be called P) wherein said controller comprises a neural network; wherein said inputs received by said controller are from the set of inputs including all P inputs or any subset thereof (except only P,I,D inputs), and $x_p$, y, $y_r$, u and all algebraic, differential and integral operators of these $x_p$, y, $y_r$ and u inputs;

wherein training is done off-line over a variety of process models, and further comprising:

an input controller processor means for passing data to other controllers and wherein said input controller processor means further comprises an output controller processor that reviews the outputs of other controllers and determines which of those is used as input to the process, wherein:

$x_p$ is dynamic state variables of the process, y is a process output signal, $y_r$ is a reference input signal, and u is a control adjustment signal; and wherein the output controller processor provides an output signal that is used as input to the process as determined by said output controller processor.

9. A controller of a process which accepts modification of its behavior through input signals representative of parameters that are members of a set of parameters including: control parameters $p_c$, process parameters $p_p$, and disturbance parameters $p_d$ (which may collectively be called P) wherein said controller comprises a neural network;

wherein said inputs received by said controller are from the set of inputs including all P inputs or any subset thereof (except only P,I,D inputs), and $x_p$, y, $y_r$, u and all algebraic, differential and integral operators of these $x_p$, y, $y_r$ and u inputs;

wherein said controller comprises an input controller processor and a plurality of other controllers, at least one of which other controllers is a neural network; and wherein:

$x_p$ is dynamic state variables of the process, y is a process output signal, $y_r$ is a reference input signal, and u is a control adjustment signal; and wherein said controller provides a control signal to at least one actuator associated with the process so that a detectable physical change occurs in the characteristics of the process.

* * * * *